Figure 1:
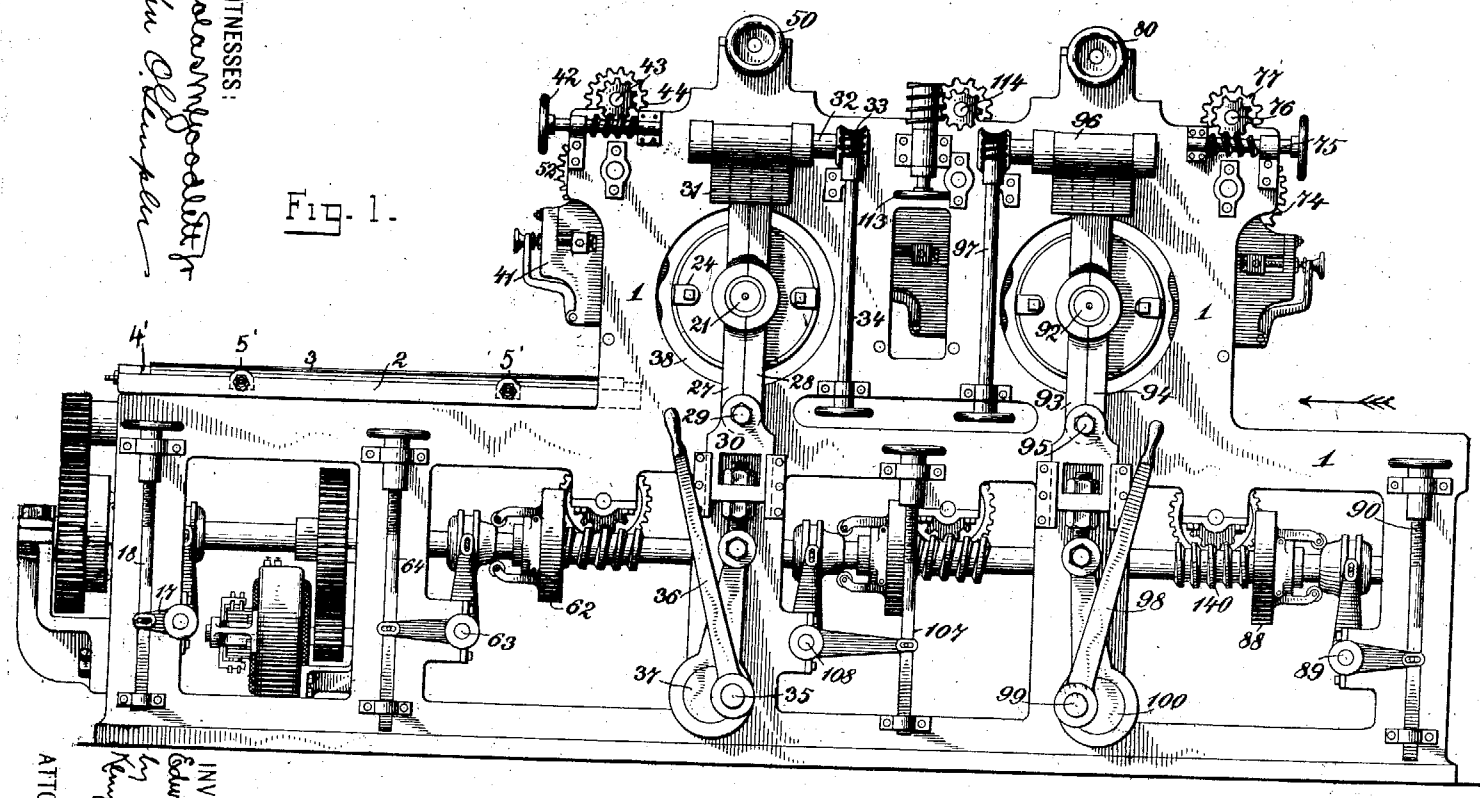

No. 11,903.

Reissued Apr. 9, 1901.

E. HETT.

MACHINE FOR MAKING PRINTING SURFACES.

(Application filed Mar. 5, 1901.)

4 Sheets—Sheet 1.

WITNESSES:

Nicholas M. Goodlett Jr

John O. Kempler

INVENTOR

Edward Hett by Kempner & Kempner

ATTORNEYS

No. 11,903. Reissued Apr. 9, 1901.

E. HETT.

MACHINE FOR MAKING PRINTING SURFACES.

(Application filed Mar. 5, 1901.)

4 Sheets—Sheet 2.

WITNESSES:

Nicholas M. Goodlett Jr.

John O. Geupel

INVENTOR

Edward Hett by Kenyon & Kenyon

ATTORNEYS

No. 11,903.
Reissued Apr. 9, 1901.
E. HETT.
MACHINE FOR MAKING PRINTING SURFACES.
(Application filed Mar. 5, 1901.)
4 Sheets—Sheet 3.
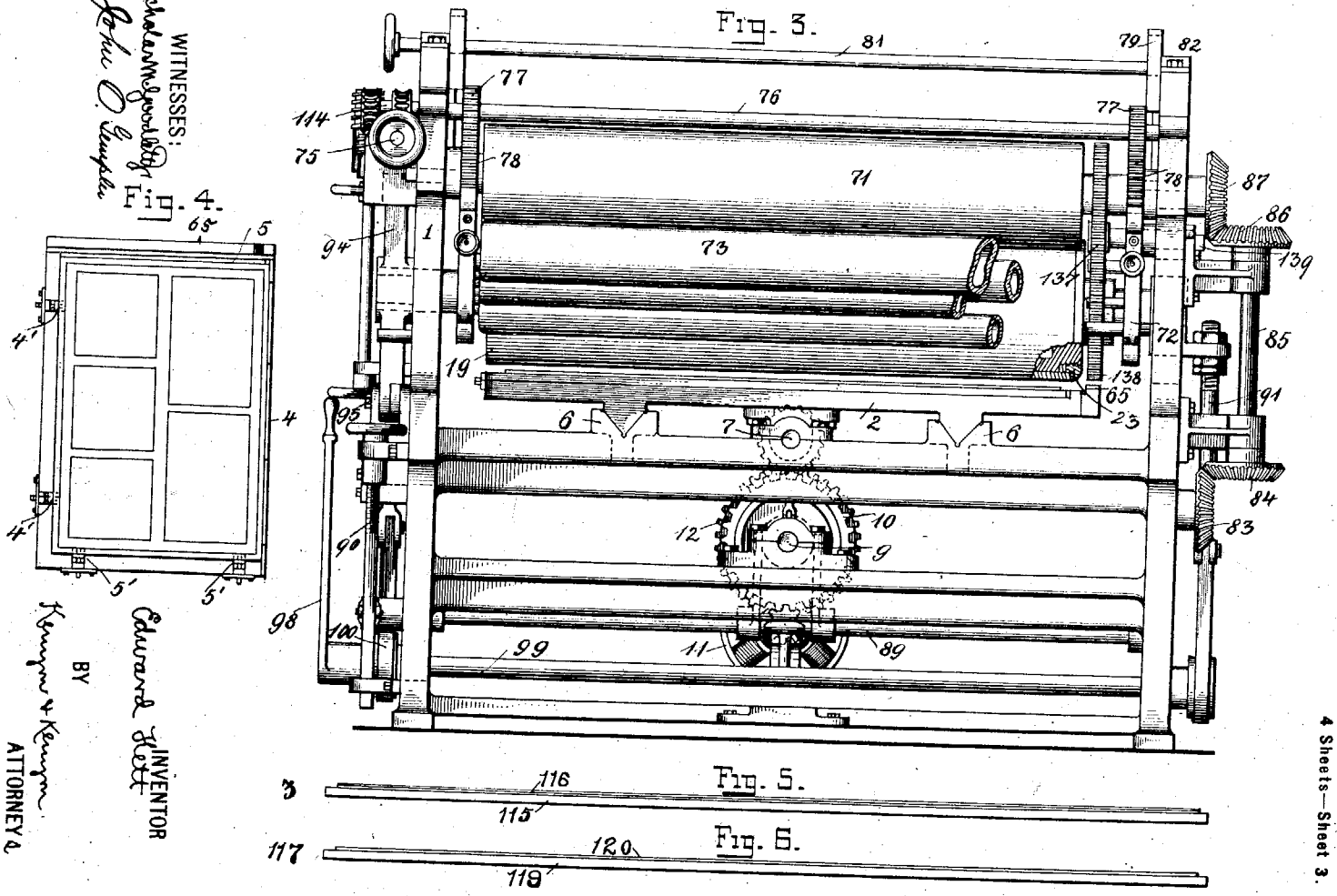
WITNESSES:
Nicholas M. Goodlatte
John O. Gempler
INVENTOR
Edward Hett
BY
Kenyon & Kenyon
ATTORNEYS No. 11,903.

Reissued Apr. 9, 1901.

E. HETT.

MACHINE FOR MAKING PRINTING SURFACES.

(Application filed Mar. 5, 1901.)

4 Sheets—Sheet 4.

WITNESSES:
Nicholas W. Goodlett Jr.
John O. Templer

INVENTOR
Edward Hett

BY
Kenyon & Kenyon
ATTORNEYS

UNITED STATES PATENT OFFICE.

EDWARD HETT, OF NEWDORP, NEW YORK, ASSIGNOR TO THE AMERICAN LITHOGRAPHIC COMPANY, OF NEW YORK.

MACHINE FOR MAKING PRINTING-SURFACES.

SPECIFICATION forming part of Reissued Letters Patent No. 11,903, dated April 9, 1901.

Original No. 662,864, dated November 27, 1900. Application for reissue filed March 5, 1901. Serial No. 49,965.

*To all whom it may concern:*

Be it known that I, EDWARD HETT, a citizen of the United States, and a resident of Newdorp, in the county of Richmond and State of New York, have invented certain new and useful Improvements in Machines for Making Printing-Surfaces, of which the following is a specification.

This invention relates to machines designed for use in making printing-surfaces, and more particularly to machines adapted to be employed to impose a design or plurality of designs upon a printing-form adapted to be transformed into a printing-surface for the design or designs. The printing-form when completed may be either planographic, relief, intaglio, or other character.

The invention seeks, among other things, to combine in one machine mechanism whereby a design or plurality of designs may be imposed from a setting-up plate or other basic surface upon a printing-form and mechanism whereby the design or designs so imposed upon said printing-form may be imposed upon a second printing-form. For convenience the first-named printing-form will be herein termed the "primary printing-form," and when developed into a printing-surface it will be termed the "primary printing-surface." The second-mentioned printing-form will for convenience be termed the "secondary printing-form" and when developed into a printing-surface the "secondary printing-surface." In the preferred construction the design or designs are communicated from the primary printing-surface to a suitable conveying-surface and are then communicated from the conveying-surface to the secondary printing-form. The invention, however, includes within its scope an arrangement whereby the design or designs of the primary printing-surface may be communicated directly to the secondary printing-form without the intermediation of a conveying-surface.

In addition to the mechanism above referred to the invention also seeks to provide means whereby the design or designs of the setting-up plate or other basic surface may be imposed upon the primary printing-form in accurate predetermined position and a means whereby the design or designs may be then communicated to or imposed upon the secondary form in accurate predetermined position and with reference to register in the ultimate use of the secondary printing-surface in its operation of printing. The secondary printing-form is preferably constructed of predetermined size and shape, so as to accurately fit in a preëstablished seat in the machine or transfer-press and in a preëstablished seat in a printing-press. It is removable from and replaceable in said seats, so that other secondary printing-forms may be mounted in said seats and accurately fit and work with the coöperating parts of said presses.

The printing-forms are preferably curved, so as to work in a rotary printing-press, and they are also preferably shell-like, cylindrical, and tubular. The primary printing-forms are preferably constructed so as to be identical in size and form with the secondary printing-forms and so as to be removable from and replaceable in a preëstablished seat in the transfer-press and so that other primary printing-forms may be mounted accurately in the same seat in such press. Of course it is not essential that the primary printing-forms shall be made so as to fit a preëstablished seat or seats in a printing-press unless such forms are to be used in printing. It will be most economical, however, to so construct them with reference to a printing-press.

The basic surface or setting-up plate is constructed to accurately fit in a preëstablished seat in the transfer-press and is removable from and replaceable therein. The conveying-surface is also preferably removable and replaceable in a preëstablished seat in the transfer-press, and in the simplest construction the same seat is employed for the basic surface and for the conveying-surface. Both the basic and the conveying surface, or either of them, might with some advantage be permanently mounted in the transfer-press, and such arrangement is within the scope of my invention. The basic surface and conveying-surface are both preferably flat and mounted upon a horizontal reciprocating bed or beds, the primary and secondary forms working by rolling contact with said surfaces. The invention is not limited, however, in its broad aspect to a basic surface which is flat or reciprocating nor to a conveying-surface which is flat or reciprocating. Either or both of these surfaces may be curved and either or both of them may rotate or be stationary. The invention is not in its broad scope limited to any particular form or shape of basic surface, of conveying-surface, of primary printing-form, or of secondary printing-form, nor is it so limited to any particular character of movement of these features in the operation of imposing a design or designs from one to another.

In the accompanying drawings, which form part of this specification, I have illustrated a machine embodying the various features of the invention in their preferrred form and also modifications.

Figure 2:
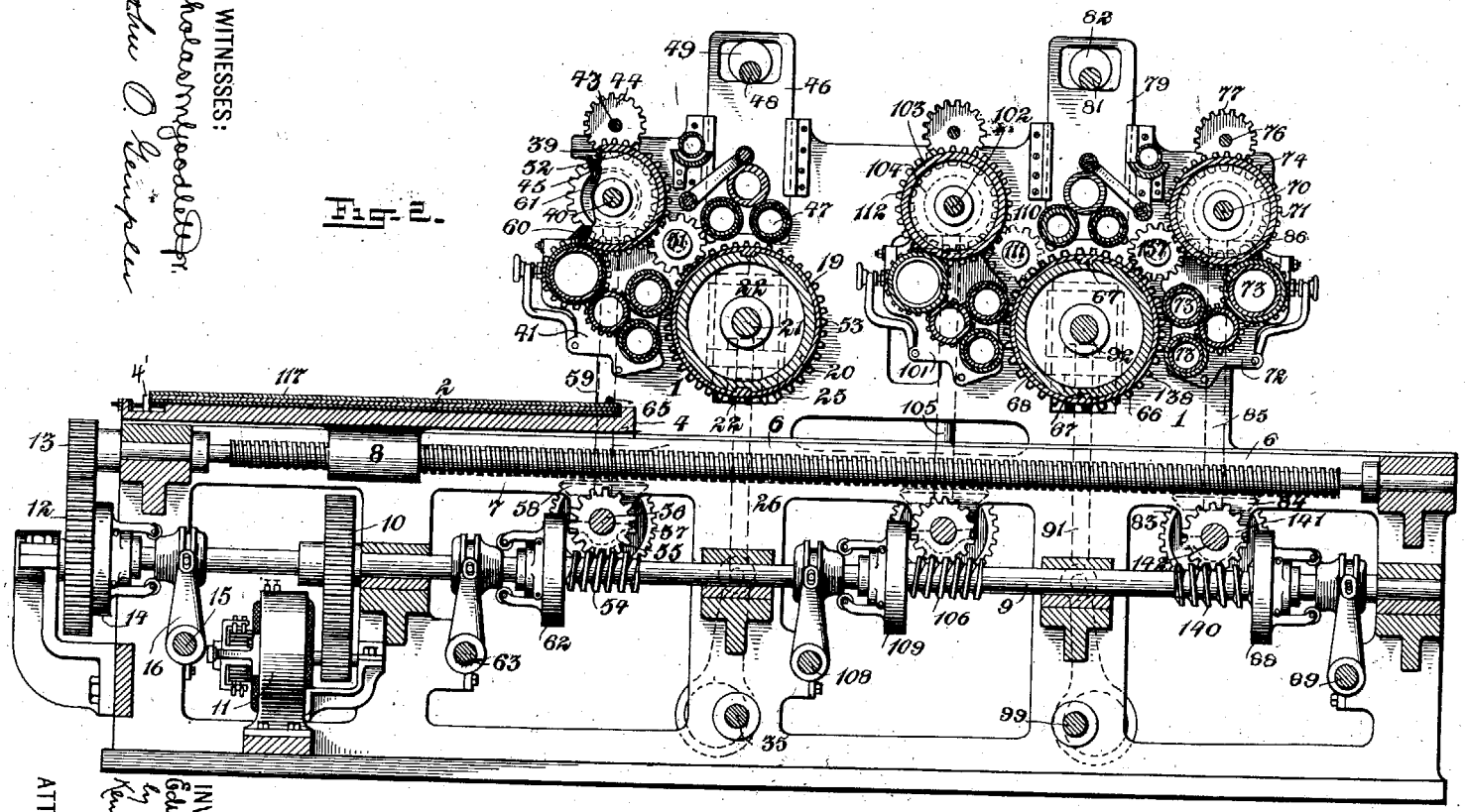
Figure 7:
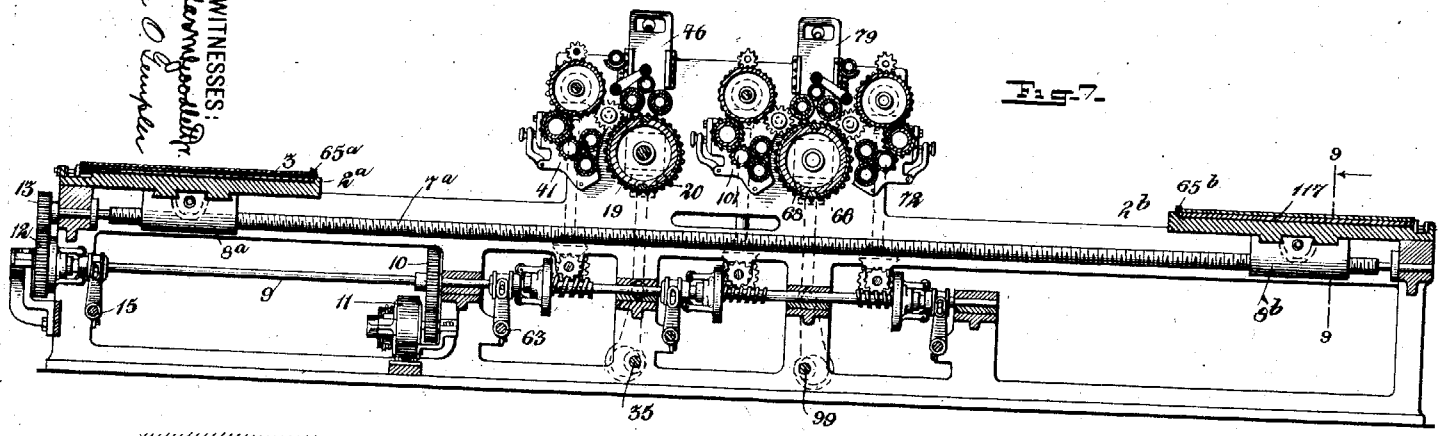
Figure 8:
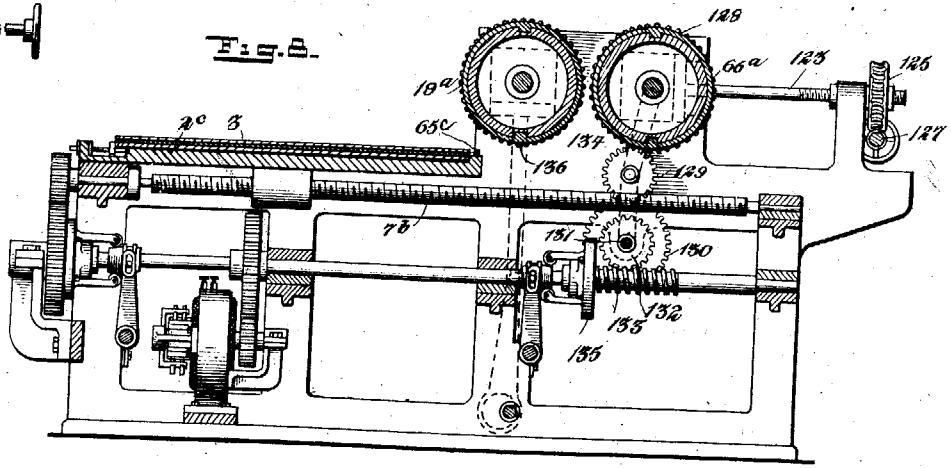
Figure 9:
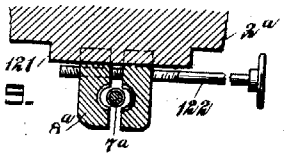

Figure 1 is a side elevation of the machine in its preferred form. Fig. 2 is a central longitudinal section of the machine shown in Fig. 1. Fig. 3 is an end elevation looking in the direction of the arrow in Fig. 1. Fig. 4 is a plan view showing the basic surface detached from the machine and mounted in its preëstablished seat on the bed. Figs. 5 and 6 are respectively side elevations of a basic surface and conveying-surface. Figs. 7 and 8 are central longitudinal sections of modified forms of the machine. Fig. 9 shows a detail in section.

Referring now to the specific mechanism shown in the drawings, and particularly to Figs. 1, 2, and 3, the machine is provided with a suitable and substantial frame 1, which may be of any approved design, and on this frame is a bed or support 2, having thereon a removable and replaceable basic surface 3, preferably including a zinc or equivalent setting-up plate or transfer-base having fixed thereto the design or designs to be imposed upon, imparted, or transferred to the primary printing-form. The transfer-base in its best form is non-expansible and non-contractible, so that the design or designs fixed thereon are also non-expansible and non-contractible under the pressure of the primary printing-form, and thus the design or designs may be imparted to the primary printing-form. The transfer-base is generally of such thickness as to form a rigid body, as shown. It has one side and one end made perfectly true, so as to accurately fit in the preëstablished seat formed on the bed 2, which seat is determined by the ribs 4 and 5, against which the basic surface is forced by the nuts 4′ and 5′. The ribs 4 and 5, it will thus be seen, constitute guiding means, with reference to which the basic surface may be brought both longitudinally and transversely into the predetermined position required or the preëstablished seat. The design or designs of the basic surface are generally fixed thereto by being printed upon several transfer-sheets stuck up on the transfer-base after the lithographic man r. If desired, instead of always using the same transfer-base a series of transfer-bases may be employed and so constructed as to fit accurately in the same preëstablished seat on the bed 2.

The bed 2, which is flat, as shown, reciprocates horizontally in the slideways 6, formed on the frame of the machine, being driven by the rotating screw-shaft 7, which passes through the threaded nut 8, fixed to the bed. The screw-shaft 7 is driven in one direction to move the bed forward and in the opposite direction to move the bed backward by suitable mechanism. In the present instance I employ a main drive-shaft 9, on which is fixed a gear-wheel 10, geared to the motor 11. On the shaft 9 is a gear-wheel 12, meshing with the gear-wheel 13, fast on the screw-shaft 7. The gear-wheel 12 is locked on the shaft 9 and unlocked therefrom by the clutch 14, operated by the shaft 15. This shaft carries a clutch-operating arm 16 and also arm 17, having a slot which receives a pin carried by the hand-shaft 18. By operating the shaft 18 the wheel 12 may be locked and unlocked with respect to the shaft 9. The motor 11 is reversed to reverse the screw-shaft 7.

19 is a primary printing-form carried on the support 20 and from which it is preferably removable and replaceable. In its best form the primary printing-form is continuous, cylindrical, and tubular in form, the support being in the form of a hollow cylinder and bodily removable and replaceable on the shaft 21, on which it is locked in place. The primary printing-form 19 is shell-like, as shown, and is provided with ribs 22 on the under side, which are adapted to enter corresponding recesses in the support 20, a marked rib in a marked recess, when the printing-form is slipped onto its support. The supporting-cylinder 20 is provided with a circumferential shoulder 23, against which the printing-form is adapted to accurately fit and against which it is pressed home and held by the clamps 24. The shoulder 23 and the rib 22 constitute guiding means, with reference to which the primary printing-form and successive primary printing-forms may be located accurately both longitudinally and transversely in a preëstablished seat on the support and always in the same predetermined position. Any other forms of guiding means for this purpose may of course be employed.

The shaft 21, which carries the form-support 20 and the primary printing-form 19, is movable up and down, so that the primary printing-surface may be brought into contact with the basic surface under suitable pressure and so that it may be moved out of contact with the basic surface. For this purpose the shaft 21 is carried in the vertically-moving bearings. One of these bearings (shown in dotted lines in Fig. 2) is an ordinary square box movable in the slideway 25 on one side of the main frame. This box is connected with the pressure-arm 26. The other bearing is provided by complementary semicircular recesses formed in the arms 27 and 28, pivoted on the horizontal pivot 29, fixed on the sliding frame 30. The arms 27 and 28 move up and down behind the keeper-plate 31 on a shaft 32, which is fixed on the main frame and is provided with a worm-gear 33, operated by the worm-shaft 34. When the keeper 31 is down, as shown in Fig. 1, the arms 27 and 28 are thereby held firmly together against the main frame and in an upright position. The arms 27 and 28 constitute a pressure-arm corresponding to the opposite pressure-arm 26. The shaft 35, worked by the hand-lever 36, carries eccentrics 37, which operate the pressure-arms. The main frame on the side of the arms 27 and 28 has an opening 38 large enough to permit the passage therethrough of the primary printing-form 19. When the printing-form is to be removed from the machine, the keeper 31 is moved upward out of the way of the arms 27 and 28. These arms are swung downward on the pivot 29. The cylindrical printing-form 19 is then slipped from the supporting-cylinder 20 through the opening 38. In removing the printing-form I generally employ the apparatus shown and described in the patent granted to me November 21, 1899, No. 637,579, said apparatus being provided with an arm adapted to be held in fixed alinement with the shaft 21, so that the printing-form 19 may be slipped from its supporting-cylinder upon said arm. The printing-form 19 is equipped with inking and dampening devices, whereby the printing-form is rolled up in the operation of developing it into a printing-surface and whereby the primary printing-surface 19 may be inked for the purpose of communicating its design to the secondary printing-form.

39 is the main ink-distributing cylinder, fixed on the shaft 40 and communicating ink to the printing-form 19 through the usual ink-distributing rollers, which are carried in the swinging frame 41, supported by the shaft 40. A hand worm-shaft 42 operates the shaft 43, which carries gears 44, meshing with segmental gears 45, formed on the swinging frame 41. By operating the hand-shaft 42 the frame 41 may be moved so as to carry its inking-rollers to and from the primary printing-form 19.

46 is a sliding frame carrying dampening-rollers 47 and operated by the eccentric-shaft 48, whose eccentrics 49 turn in boxes formed in the frame 46, the shaft being operated by the hand-wheel 50.

51 is a gear-wheel working on a stud fixed on the inside of the main frame and meshing with a gear 52 on the main distributing-cylinder 39 and with a gear 53 on the form-cylinder 20, so that the form-cylinder may be driven from the ink-cylinder 39. Movement is communicated to the inking-cylinder 39 from the main shaft 9 by the worm-gear 54, meshing with a gear 55 on the shaft 56, which carries a gear 57, meshing with a gear 58 on the vertical shaft 59, which carries a beveled gear 60, meshing with a beveled gear 61 on the shaft 40. The worm 54 is formed on a sleeve adapted to be locked on and released from the main shaft 9 by the clutch 62, operated by the shaft 63, which itself is actuated by the hand-shaft 64.

In order that the basic surface may impose its design or designs upon the primary printing-form in accurate predetermined position, the bed 2 is provided with a tooth 65, designed to mesh with a marked recess in the gear 53. When the basic surface and primary printing-form are coöperating, the printing-form is lowered, so that the tooth 65 enters the marked recess, and thus the basic surface and printing-form may be brought into an accurate predetermined coöperating relation, which relation may be repeatedly obtained with the same or different primary printing-forms and with the same or different basic surfaces. The tooth 65 and marked recess constitute preëstablished guides whereby this predetermined relation may be attained.

In the embodiment of the machine shown in the drawings the secondary printing-form 66 is constructed, arranged, and mounted in identically the same way as the primary printing-form 19 and is equipped with inking and dampening rollers of the same construction and arrangement as those for the primary printing-form. Only a brief reference to the secondary printing-form and its inking and dampening rollers will therefore be required. The secondary printing-form has ribs 67, which enter corresponding grooves in the supporting-cylinder 68, which is provided with a circumferential shoulder at one end, against which the printing-form accurately fits when seated on its support. This circumferential shoulder is not shown in the drawings; but it is similar to shoulder 23 on the primary printing-form. A marked rib 67 enters a marked groove in the cylinder 68, and these ribs and the circumferential shoulder constitute guides whereby the printing-form may be mounted in accurate predetermined position both longitudinally and transversely on its support. Swung from the shaft 70, on which turns the main distributing-cylinder 71, is the inking-frame 72, carrying inking-rollers 73. The gear 74 on the hub of the cylinder 71 drives the idle gear 137, which meshes with and drives the gear 138 on the cylinder 68. The gear 137 is carried on a stud 139. The inking-frame 72 is moved to and from the secondary printing-form by the hand-shaft 75, which actuates the shaft 76, carrying the gear 77, which meshes with the segmental gear 78 on the frame 72.

79 is the sliding dampening-frame, carrying the dampening-rollers and operated by the hand-wheel 80 on the shaft 81, which carries eccentrics 82, working in boxes in the frame 79. The main ink-distributing cylinder 71 is driven from the main shaft 9 by the worm-sleeve 140, which meshes with the gear 141 on the shaft 142, carrying the gear 83, meshing with the gear 84 on the upright shaft 85, this upright shaft 85 carrying the beveled gear 86, which meshes with the beveled gear 87 on the cylinder 71. The worm-sleeve 140 is connected and disconnected with the shaft 9 by the clutch 88, operated from the shaft 89, which has the hand-shaft 90. The pressure-arm 91 carries one of the sliding boxes for one end of the shaft 92 of the cylinder 68, and the pressure-arms 93 and 94 carry the other boxes for the other end of the shaft 92, the arms 93 and 94 being mounted upon the pivot 95 and held in place by the keeper 96, which is operated by the hand-shaft 97. The lever 98 turns the shaft 99, which carries the eccentrics 100, connected with and operating the pressure-arms.

The secondary printing-form 66 may be provided with a secondary set of inking-rollers adapted to apply a suitable preserving body or ink to the printing-form 66 after the latter has been converted into a lithographic or planographic printing-surface. In the particular machine shown in the drawings these inking-rollers are mounted, arranged, and operated in the same way as the inking-rollers in the frames already described. 101 is the secondary inking-frame for these secondary inking-rollers. It is swung from the shaft 102, on which is loosely mounted the main ink-distributing cylinder 103, carrying a beveled gear 104, driven from the shaft 105, which is connected with and driven from the worm-sleeve 106 on the main shaft 9, the arrangement of the gearing being the same as has already been described. The hand-shaft 107 actuates the shaft 108, operating the clutch 109 to connect and disconnect the screw-sleeve 106 from the shaft 9. The gear 110 on the stud 111 meshes with the gear 76 and with the gear 112 of the cylinder 103, so that the main ink-distributing cylinder 103 drives the secondary printing-form 66. The studs 139 and 111 have square heads and are threaded in the main frame, so that the gears 137 and 110, carried thereon, can be drawn in toward the main frame and out of mesh with their connecting-gears in order that each set of inking-rollers may operate separately in conjunction with the secondary printing-form.

The hand-shaft 113 operates the shaft 114 to move the frame 101 to and from the secondary printing-form and in the same way and by the same means as the hand-shaft 75 and shaft 76.

The basic surface 3 preferably consists of a rigid backing 115, made of metal or other suitable material, and several sheets of thick paper 116, which are smoothly placed upon and secured to the backing, said backing and the sheets of paper constituting the transfer-base bearing on its upper surface one or more designs. The bed 2 generally carries a yielding blanket or body which may be made of rubber and upon which the basic surface rests when in its seat upon the bed. Of course the basic surface may be constructed in any other suitable manner.

The conveying-surface 117 generally consists of a rigid backing 119, carrying on its upper surface a thin rubber sheet 120 and upon which the designs are to be imposed. Various constructions of the conveying-surface may of course be employed. Where rubber is used, as just described, the designs imposed thereon by the primary printing-surface may be effaced and the same conveying-surface may be used repeatedly. I might, however, stretch a sheet of paper on a suitable base, and said sheet of paper, when the design or plurality of designs of the primary printing-surface have been imposed thereon, may be bodily turned over upon the secondary printing-form. In such cases a new sheet of paper would necessarily be used in each separate operation, because the designs would not be effaceable from the paper.

The operation of the machine is as follows: The basic surface being mounted in its preestablished seat on the bed 2, the bed is moved forward by the motor 11 beneath the primary form 19, which is lowered to bring the tooth 65 on the bed into mesh between the marked tooth on the gear 53. The bed is then moved forward with the basic surface and printing-form in contact, suitable pressure being applied to this contact by the pressure-arms 26, 27, and 28. The printing-form is thus made to rotate in rolling contact with the basic surface, which imparts the designs thereon to the printing-form. If the designs for the basic surface are on separate transfer-sheets, as shown in Fig. 4, these transfer-sheets will be turned over bodily upon the printing-form and the designs imposed upon said printing-form. Thus the designs are imposed upon the primary printing-form in accurate predetermined position and with reference to register. Bed 2 is then moved back out of the way and the designs on the printing-form developed and made permanent. This may be done by etching and rolling up after the lithographic manner, or the development may be in accordance with any other method of treatment. If desired, after the lithographic method of development has been resorted to the printing-form may be routed out or depressed. This development of the printing-form may be done apart from the machine; but the inking and dampening rollers carried in the frames 41 and 46, respectively, are intended in the machine shown in the drawings to be employed in rolling up the printing-form, so that the printing-form may be developed in the lithographic manner without withdrawing it from the machine. The primary printing-surface having been developed in suitable manner, the basic surface 3 is then taken off of the bed 2 and the conveying-surface is mounted on the bed 2 in the preëstablished seat prepared to receive it, which seat may be, and as shown in the drawings is, the same as the seat for the basic surface 3. The bed 2 is then brought into contact with the primary printing-surface, the tooth 65 being first entered in the marked recess of the gear 53. As the bed moves forward the design or designs of the primary surface are imparted to the conveying-surface in accurate predetermined position both longitudinally and transversely. The secondary printing-form 66 is then brought down upon the conveying-surface, the tooth 65 entering the marked recess in the gear 76, and the design or designs on the conveying-surface are imparted to the secondary printing-form. The bed 2 is then moved back out of the way, and the secondary printing-form is developed into a printing-surface of the character desired. In carrying out this development the inking and dampening rollers carried in the frames 72 and 79, respectively, are employed in the manner well understood, the inking-frame 101 having been moved out of the way. After the secondary printing-surface has been developed it is then rolled up by means of the secondary inking-rollers in the frame 101, which are employed to apply to the printing-surface a suitable preserving body in the manner and for the purpose described in my pending application for "rolling-up machine," Serial No. 709,877, filed March 21, 1899. This preserving body, which is preferably a light-colored ink, serves to preserve the design, especially when the printing-surface is to be stored some time before use, and need not be washed off of the printing-surface before using the printing-surface in the operation of printing. The dampening-rollers in the frame 79 are used in conjunction with the secondary inking-rollers. Of course, if desired, the entire treatment of the secondary printing-form in converting it into a printing-surface and in subsequently applying the preserving body may be carried out apart from the machine. A series of duplicate secondary printing-surfaces may thus be made from one primary printing-surface. A series of secondary printing-surfaces may also be made which have component designs adapted to register in printing. In this latter case a series of primary surfaces would be first made having component designs.

The primary and secondary printing-forms are driven by frictional contact with the basic surface or conveying-surface on the bed 2; but, if desired, they might be driven by some suitable form of gearing in accurate unison with said surfaces.

In Fig. 7 is shown a machine similar to that illustrated in Figs. 1, 2, and 3, except that there are separate beds for the basic surface and for the conveying-surface. $2^a$ is the bed or support for the basic surface 3, and $2^b$ is the bed or support for the conveying-surface 117. These supports are moved back and forth by the screw-shaft $7^a$, driven from the main shaft 9, and instead of having nuts permanently connected with the screw-shaft $7^a$, like the nut 5 of bed 2 in Fig. 1, they have threaded split sleeves $8^a$ and $8^b$, adapted to be connected and disconnected from the screw-shaft $7^a$, so that the beds can be moved back and forth separately and independently. The split sleeve $8^a$ is shown in detail in Fig. 9. The upper side of the sleeve is dovetailed in a transverse slideway 121, carried on the bed $2^a$, and the two parts of the sleeve are made to clutch and unclutch the screw-shaft $7^a$ by the screw-shaft 122. The bed $2^a$ has a tooth $65^a$, and the bed $2^b$ has a tooth $65^b$, these teeth entering marked recesses of the gears for the primary and secondary forms, respectively, for the same purpose as the tooth 65 on the bed 2.

In Fig. 8 the machine is arranged so that the primary printing-form $19^a$ after having received the design or designs from the basic surface 3 may impose the design or designs directly upon the secondary printing-form $66^a$ without the intermediation of a conveying-surface. The bed $2^c$ is moved back and forth by the screw-shaft $7^b$, and the primary printing-form is brought down under pressure upon the basic surface 3. After the primary printing-form has been developed into a printing-surface the primary and secondary printing-forms are brought together in operating contact. For this purpose either one or both of the forms may be moved. As shown in Fig. 8, the secondary form $66^a$ only is moved, being supported in sliding boxes arranged to move back and forth in horizontal slideways in the main frame by arms 123 and 124, the latter of which is not shown. The outer ends of these arms are threaded and carry worm-wheels 125 and 126, the latter not being shown, the arms passing through threaded bearings in the main frame. By rotating the hand-shaft 127 the arms 123 and 124 are moved back and forth, so that the printing-forms may be separated or brought together in contact under proper pressure. The secondary printing-form carries a gear 128, which meshes with an idle gear 129, which meshes with a gear 130 on a shaft 131, carrying a worm-gear 132, meshing with the worm-sleeve 133 on the driving-shaft. The gear 129 is carried on the pivot of the toggle 134, whose outer ends are pivoted, respectively, on the shaft 131 and on the shaft of the secondary printing-form. The worm-sleeve 133 is made fast and loose on the drive-shaft by the clutch 135. By means of the toggle 134 and the connecting-gearing the secondary form may be driven, notwithstanding its change of position in the main frame. The primary and secondary forms may be driven together by frictional contact or by suitable gearing. In order that they may be always brought into proper and predetermined coöperating relation, the marked recess 136 on the support of the form $19^a$ is brought into mesh with a marked tooth on the gearing 128. The bed $2^c$ has a tooth $65^c$, adapted to enter the marked recess 136, so as to provide a guide with reference to which the basic surface and primary printing-form may be brought into accurate predetermined coöperating relation.

If desired, both the basic surface 3 and the conveying-surface 117 in Fig. 7 and the basic surface 3 in Fig. 8 may be permanently secured to its supports. In this case the designs will be imposed upon the base of the basic surface while in place in the machine.

While I have shown the various features of the invention in the best forms now known to me, it will be understood that various changes may be made in the form and arrangement of the parts embodying the invention. So far as I am aware I am the first to provide a machine by means of which a basic surface may be employed to impose a design or designs upon a printing-form or primary printing-form and the said primary printing-form be employed to impose its design or designs upon another or secondary printing-form, and I wish to claim the same herein broadly; also, in connection with guiding means whereby the design or designs may be thus imposed upon the secondary printing-form in accurate predetermined position and with reference to register.

The method in accordance with which and the mechanism whereby the design or designs are imposed upon the printing-forms 19 and 19[a] are shown and described in the patents granted to me November 21, 1899, Nos. 637,555 and 637,556. The method in accordance with which and the mechanism whereby the design or designs are imposed upon the printing-forms 66 and 66[a] are shown and described in the patents granted to me November 21, 1899, Nos. 637,595, 637,596, and 637,599. Reference is now made to those patents for a more detailed description of the method and apparatus referred to.

What I claim as new, and desire to secure by Letters Patent, is—

1. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a conveying-surface adapted to receive the design or designs of the primary printing-form and impart them to the secondary printing-form; and means for imparting the design or designs from the basic surface to the primary printing-form and from the primary printing-form to the secondary printing-form, through the intermediation of the conveying-surface.

2. In a machine for making printing-surfaces, the combination of a primary printing-form adapted to have a design or designs imposed upon it; a basic surface having one or more designs adapted to be imposed upon the primary printing-form; a curved shell-like secondary printing-form adapted to receive the design or designs imposed upon the primary printing-form; a conveying-surface adapted to receive the design or designs of the primary printing-form and impart them to the secondary printing-form; and means for imparting the design or designs from the basic surface to the primary printing-form and from the primary printing-form to the secondary printing-form through the intermediation of the conveying-surface.

3. In a machine for making printing-surfaces, the combination of a primary printing-form adapted to have a design or designs imposed upon it; a removable and replaceable basic surface having one or more designs adapted to be imposed upon the primary printing-form; a secondary printing-form adapted to receive the design or designs imposed upon the primary printing-form; a conveying-surface adapted to receive the design or designs of the primary printing-form and impart them to the secondary printing-form; and means for imparting the design or designs from the basic surface to the primary printing-form and from the primary printing-form to the secondary printing-form through the intermediation of the conveying-surface.

4. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a removable and replaceable conveying-surface adapted to receive the design or designs of the primary printing-form and impart them to the secondary printing-form; and means for imparting the design or designs from the basic surface to the primary printing-form and from the primary printing-form to the secondary printing-form, through the intermediation of the conveying-surface.

5. In a machine for making printing-surfaces, the combination of a primary printing-form adapted to have a design or designs imposed upon it; a removable and replaceable basic surface having one or more designs adapted to be imposed upon the primary printing-form; a secondary printing-form adapted to receive the design or designs imposed upon the primary printing-form; a removable and replaceable conveying-surface adapted to receive the design or designs of the primary printing-form and impart them to the secondary printing-form; and means for imparting the design or designs from the basic surface to the primary printing-form and from the primary printing-form to the secondary printing-form through the intermediation of the conveying-surface.

6. In a machine for making printing-surfaces, the combination of a primary printing-form adapted to have a design or designs imposed upon it; a basic surface having one or more designs adapted to be imposed upon the primary printing-form; a rotary secondary printing-form adapted to receive the design or designs imposed upon the primary printing-form; a conveying-surface adapted to receive the design or designs of the primary printing-form and impart them to the secondary printing-form; and means for imparting the design or designs from the basic surface to the primary printing-form and from the primary printing-form to the secondary printing-form through the intermediation of the conveying-surface.

7. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface, and guides with reference to which said bodies may be brought into accurate predetermined operating relation for the purpose of imposing the design or designs upon the secondary printing-form in accurate predetermined position.

8. In a machine for making printing-surfaces, the combination of a primary printing-form adapted to have a design or designs imposed upon it; a basic surface having one or more designs adapted to be imposed upon the primary printing-form; a rotary secondary printing-form adapted to receive the design or designs imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface, and guides with reference to which said bodies may be brought into accurate predetermined operating relation for the purpose of imposing the design or designs upon the secondary printing-form in accurate predetermined position.

9. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a removable and replaceable conveying-surface adapted to receive the design or designs of the primary printing-form and impart them to the secondary printing-form; an accurately-preëstablished seat for the conveying-surface; and means for imparting the design or designs from the basic surface to the primary printing-form and from the primary printing-form to the secondary printing-form, through the intermediation of the conveying-surface.

10. In a machine for making printing-surfaces, the combination of a primary printing-form adapted to have a design or designs imposed upon it; a removable and replaceable basic surface having one or more designs adapted to be imposed upon the primary printing-form; an accurately-preëstablished seat for the basic surface; a secondary printing-form adapted to receive the design or designs imposed upon the primary printing-form; a conveying-surface adapted to receive the design or designs of the primary printing-form and impart them to the secondary printing-form; an accurately-preëstablished seat for the conveying-surface; and means for imparting the design or designs from the basic surface to the primary printing-form and from the primary printing-form to the secondary printing-form through the intermediation of the conveying-surface.

11. In a machine for making printing-surfaces, the combination of a primary printing-form adapted to have a design or designs imposed upon it; a removable and replaceable basic surface having one or more designs adapted to be imposed upon the primary printing-form; an accurately-preëstablished seat for the basic surface; a secondary printing-form adapted to receive the design or designs imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface, and guides with reference to which said bodies may be brought into accurate predetermined operating relation for the purpose of imposing the design or designs upon the secondary printing-form in accurate predetermined position.

12. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a removable and replaceable conveying-surface adapted to receive the design or designs of the primary printing-form and impart them to the secondary printing-form; an accurately-preëstablished seat for the conveying-surface; and means for imparting the design or designs from the basic surface to the primary printing-form and from the primary printing-form to the secondary printing-form, through the intermediation of the conveying-surface, and guides with reference to which said bodies may be brought into accurate predetermined operating relation for the purpose of imposing the design or designs upon the secondary printing-form in accurate predetermined position.

13. In a machine for making printing-surfaces, the combination of a primary printing-form adapted to have a design or designs imposed upon it; a basic surface having one or more designs adapted to be imposed upon the primary printing-form; a removable and replaceable secondary printing-form adapted to receive the design or designs imposed upon the primary printing-form; an accurately-preëstablished seat in which said secondary printing-form and successive secondary printing-forms may be mounted; an accurately-preëstablished seat for the basic surface; and means for imparting the design or designs from the basic surface to the primary printing-form and from the primary printing-form to the secondary printing-form.

14. In a machine for making printing-surfaces, the combination of a primary printing-form adapted to have a design or designs imposed upon it; a basic surface having one or more designs adapted to be imposed upon the primary printing-form; an accurately-preëstablished seat for the basic surface; a removable and replaceable secondary printing-form adapted to receive the design or designs imposed upon the primary printing-form; an accurately-preëstablished seat in which said secondary printing-form and successive secondary printing-forms may be mounted; an accurately-preëstablished seat for the primary printing-form, and means for imparting the design or designs from the basic surface to the primary printing-form and from the primary printing-form to the secondary printing-form.

15. In a machine for making printing-surfaces, the combination of a primary printing-form adapted to have a design or designs imposed upon it; a basic surface having one or more designs adapted to be imposed upon the primary printing-form; a removable and replaceable secondary printing-form adapted to receive the design or designs imposed upon the primary printing-form; an accurately-preëstablished seat in which said secondary printing-form and successive secondary printing-forms may be mounted; an accurately-preëstablished seat for the basic surface; means for imparting the design or designs from the basic surface to the primary printing-form and from the primary printing-form to the secondary printing-form; and guides with reference to which said bodies may be brought into accurate predetermined operating relation for the purpose of imposing the design or designs upon the secondary printing-form in accurate predetermined position.

16. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface and inking devices for the primary printing-form.

17. In a machine for making printing-surfaces, the combination of a primary printing-form adapted to have a design or designs imposed upon it; a basic surface having one or more designs adapted to be imposed upon the primary printing-form; a rotary secondary printing-form adapted to receive the design or designs imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface, and inking devices for the primary printing-form.

18. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; means for imparting the design or designs from the basic surface to the primary printing-form and from the primary printing-form to the secondary printing-form; guides with reference to which said bodies may be brought into accurate predetermined operating relation for the purpose of imposing the design or designs upon the secondary printing-form in accurate predetermined position, and inking devices for the primary printing-form.

19. In a machine for making printing-surfaces, the combination of a primary printing-form adapted to have a design or designs imposed upon it; a basic surface having one or more designs adapted to be imposed upon the primary printing-form; a secondary printing-form adapted to be imposed upon the primary printing-form; a conveying-surface adapted to receive the design or designs of the primary printing-form and impart them to the secondary printing-form; means for imparting the design or designs from the basic surface to the primary printing-form and from the primary printing-form to the secondary printing-form through the intermediation of the conveying-surface; guides with reference to which said bodies may be brought into accurate predetermined operating relation for the purpose of imposing the design or designs upon the secondary printing-form in accurate predetermined position, and inking devices for the primary printing-form.

20. In a machine for making printing-surfaces, the combination of a primary printing-form adapted to have a design or designs imposed upon it; a removable and replaceable basic surface having one or more designs adapted to be imposed upon the primary printing-form; an accurately-preëstablished seat for the basic surface; a secondary printing-form adapted to receive the design or designs imposed upon the primary printing-form; a conveying-surface adapted to receive the design or designs of the primary printing-form and to impart them to the secondary printing-form; means for imparting the design or designs from the basic surface to the primary printing-form and from the primary printing-form to the secondary printing-form through the intermediation of the conveying-surface, and inking devices for the primary printing-form.

21. In a machine for making printing-surfaces, the combination of a primary printing-form adapted to have a design or designs imposed upon it; a basic surface having one or more designs adapted to be imposed upon the primary printing-form; a secondary printing-form adapted to receive the design or designs imposed upon the primary printing-form; a removable and replaceable conveying-surface adapted to receive the design or designs of the primary printing-form and impart them to the secondary printing-form; an accurately-preëstablished seat for the conveying-surface; means for imparting the design or designs from the basic surface to the primary printing-form and from the primary printing-form to the secondary printing-form, through the intermediation of the conveying-surface, and inking devices for the primary printing-form.

22. In a machine for making printing-surfaces, the combination of a basic surface accurately mounted in predetermined position in the machine; a support having an accurately-preëstablished seat for a conveying-surface; a primary printing-form; a support having an accurately-preëstablished seat for a secondary printing-form in which successive printing-forms may be mounted; and means for effecting contact between the primary printing-form and a basic surface, between a conveying-surface seated on its support and the primary printing-form, and between said conveying-surface and a secondary printing-form on its support.

23. In a machine for making printing-surfaces, the combination of a basic surface accurately mounted in predetermined position in the machine; a support having an accurately-preëstablished seat for a conveying-surface; a primary printing-form; a support having an accurately-preëstablished seat for a secondary printing-form in which successive printing-forms may be mounted; means for effecting contact between the primary printing-form and a basic surface, between a conveying-surface seated on its support and the primary printing-form, and between said conveying-surface and a secondary printing-form seated on its support, and guiding means with reference to which said bodies may be brought into accurate predetermined coöperating relation with a view to register in printing.

24. In a machine for making printing-surfaces, the combination of a support adapted to receive a removable and replaceable basic surface and a removable and replaceable conveying-surface, said support having guides with reference to which said surfaces may be seated successively on the support in accurate predetermined position; a support for a primary printing-form having guides with reference to which successive primary printing-forms may be accurately seated on said support in accurate predetermined position; a support for a secondary printing-form having guides with reference to which successive secondary forms may be accurately seated on said support in accurate predetermined position; and means for bringing together said bodies seated on their supports in the prescribed sequence.

25. In a machine for making printing-surfaces, the combination of a support adapted to receive a removable and replaceable basic surface and a removable and replaceable conveying-surface, said support having guides with reference to which said surfaces may be seated successively on the support in accurate predetermined position; a support for a primary printing-form having guides with reference to which successive primary printing-forms may be accurately seated on said support in accurate predetermined position; a support for a secondary printing-form having guides with reference to which successive secondary printing-forms may be accurately seated on said support in accurately-predetermined position; means for bringing together said bodies seated on their supports in the prescribed sequence.

26. In a machine for making printing-surfaces, the combination of a basic surface accurately mounted in predetermined position in the machine; a support having an accurately-preëstablished seat for a conveying-surface; a primary printing-form; a support having an accurately-preëstablished seat for a secondary printing-form in which successive printing-forms may be mounted; means for effecting contact between the primary printing-form and a basic surface, between a conveying-surface seated on its support, and the primary printing-form, and between said conveying-surface and a secondary printing-form seated on its support, and inking devices for the primary printing-form.

27. In a machine for making printing-surfaces, the combination of a support adapted to receive a removable and replaceable basic surface and a removable and replaceable conveying-surface, said support having guides with reference to which said surfaces may be seated successively on the support in accurate predetermined position; a support for a primary printing-form having guides with reference to which successive primary printing-forms may be accurately seated on said support in accurate predetermined position; a support for a secondary printing-form having guides with reference to which successive secondary printing-forms may be accurately seated on said support in accurately-predetermined position; means for bringing together said bodies seated on their supports in the prescribed sequence, and inking devices for the primary printing-form.

28. In a machine for making printing-surfaces, the combination of a rotatable secondary printing-form; primary and secondary inking devices carried in movable frames on opposite sides of the printing-form for said printing-form; and a surface having one or more designs adapted to be imparted to said printing-form.

29. In a machine for making printing-surfaces, the combination of a secondary printing-form; primary and secondary inking devices for said form; a primary printing-surface; a conveying-surface; and means for bringing together said bodies in the prescribed sequence.

In testimony whereof I have signed my name to this specification in the presence of two subscribing witnesses.

EDWARD HETT.

Witnesses:
EDWIN SEGER,
J. H. FREEMAN.